Dec. 2, 1941.  J. A. McCASKELL  2,264,947
CONTINUOUS FILTER
Filed April 27, 1938

INVENTOR
Jasper A. McCaskell
BY
ATTORNEYS

Patented Dec. 2, 1941

2,264,947

UNITED STATES PATENT OFFICE 2,264,947

CONTINUOUS FILTER

Jasper A. McCaskell, Los Angeles, Calif., assignor to McCaskell Filters, Inc., Los Angeles, Calif., a corporation of California Application April 27, 1938, Serial No. 204,514

3 Claims. (Cl. 210—200)

This invention relates to filters and more particularly to an improved type of continuous filter in which filtration is effected at one point of the filter cycle with the simultaneous removal of filter cake at another point in the filter cycle.

In a prior patent issued to me on December 8, 1931, Number 1,835,796, I have disclosed an improved type of continuous filter which is provided with control means for controlling the rate of filter cake development on the filter medium. Although this prior construction has proved satisfactory in general practice, I have now found it possible to provide an improved control which is more sensitive to desired operating conditions and which is adaptable to a greater variety of slurries.

One of the principal objects of the present invention is to provide a continuous filter with a combination of control means for independently controlling the filtrate removal so that the rate of cake formation on the filter medium can be varied as desired.

Another object of the invention is to provide a differential control including independently variable bleeder and filtrate valves for controlling the pressure differential within a filter medium so that the time, pressure and volume affecting the formation of filter cake, may be separately adjustable.

Another object of the invention is to provide an improved bleeder valve construction for continuous filtration so that the operating conditions in each filter section may be separately controlled for the formation of a more uniform filter cake and so that the relative operating conditions of the respective filter units can be adjusted for the maximum yield.

It is also an object of the invention to provide an improved filter having a greater filtration capacity with a clearer filtrate and one which is particularly adapted to provide for the automatic pre-coating of the filter medium.

Further objects and advantages of the invention will appear from the following description of preferred forms of embodiment taken in connection with the attached drawing illustrative thereof, and in which.

Figure 1:
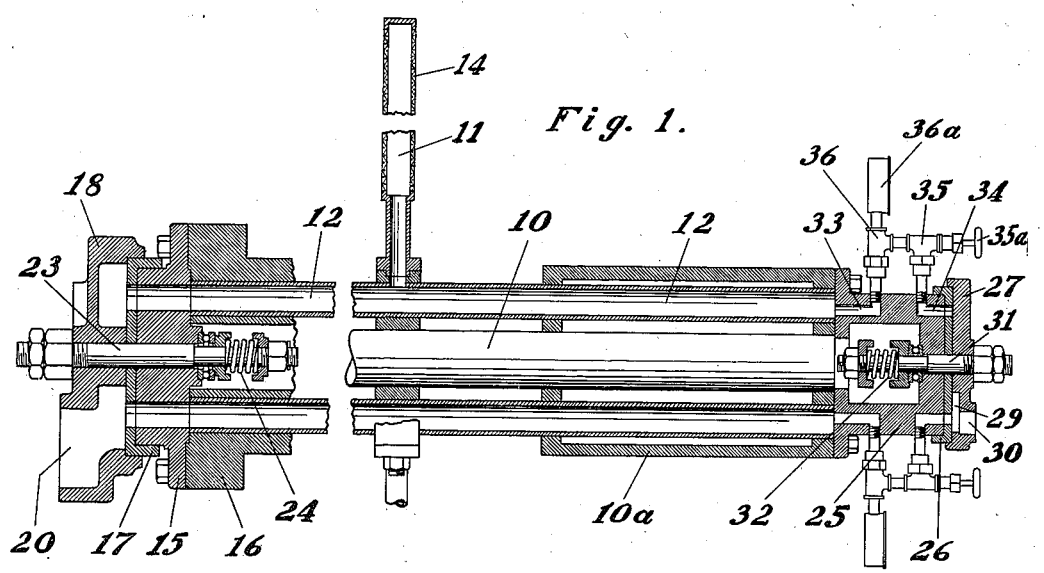
Figure 1 is a vertical section of parts of a filter shaft with parts of the valve shown in elevation.
Figure 2:
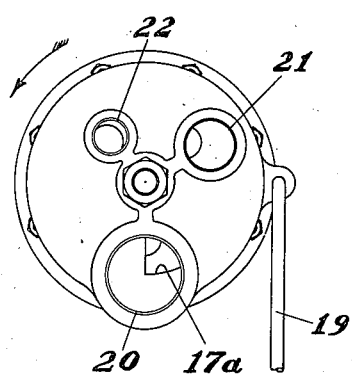
Figure 2 is an end view of the filtrate valve.
Figure 3:
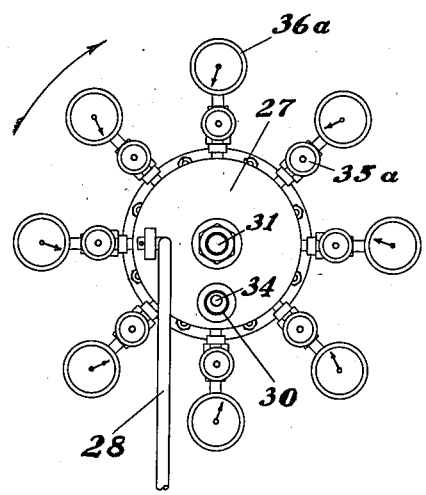
Figure 3 is an end view of the bleeder valve and associated controls.

In a typical continuous filter such as shown in my prior patent heretofore referred to, there is a continuous cycle of operations including the first step of cake formation by permitting a pressure differential to force the filtrate through a filter medium and to build up a filter cake, which step is commonly followed by washing of the cake, then subsequently drying the cake with the final removal of the cake which is facilitated by blow-back thereon. It is well known that the sudden opening of the filtrate valve allows a very substantial volume of filtrate to pass through the filter medium, and such filtrate is cloudy if the filter medium has been fully cleaned. If the slurry is of a type which clogs the pores of the filter medium, it is extremely difficult to obtain full complete filtering areas with the result that the pressure drop is excessive and the amount of filter cake formed is relatively low.

In accordance with a preferred form of embodiment of my present invention, I provide means for precisely controlling the formation of the filter cake in each filter unit and, by providing a pre-coating step, I find it possible to obtain a clearer filtrate and also to completely remove all of the filter cake during each cycle. The pre-coating step is accomplished in the preferred manner by bleeding the filter unit and, in order to prevent interference with the filtrate control, I provide a separate bleeder valve which is independent of the filtrate valve, although it operates on the same filter shaft.

In the attached drawing, no attempt has been made to show an entire filter, but it will be understood that the filter shaft, generally indicated at 10, is adapted to receive filter units 11 which are usually of a sectional type, each of which is connected to a filtrate conduit 12. Irrespective of whether the filter is of a pressure type such as shown in my prior Patent No. 1,266,133, or a vacuum type, as shown in the patent to Salisbury, No. 1,259,139, and irrespective of whether it is of a disc or drum type, the filter units move through a suitable tank of slurry and, by varying the pressure within and without the filter unit, filtrate is discharged through the filtrate conduits.

The discharge of the filtrate and the cycle control is accomplished by the provision of a filtrate valve generally indicated at 15 which is bolted to the filter shaft housing 16 on filter shaft 10. A valve seat 17 is suitably secured to the filtrate valve and is adapted to rotate with it and with the shaft which is rotated by any desired means, not shown.

The valve casing or fixed member 18, is normally held in fixed position by adjusting rod 19, and is provided with a filtrate outlet 20, a wash water port 21, and a blow-back port 22. The casing is held resiliently against the valve in any desired manner as by bolt 23 having the spring 24.

The normal operation of a filter containing only these elements would be as heretofore described, in that the approach of the valve port 17a in the valve casing 17, when it approaches the filtrate outlet section 20, would cause a sudden discharge of filtrate due to the pressure differential between the discharge at 20 and the pressure on the outside of the filter unit 11. Irrespective of whether this pressure is due to a vacuum on the filtrate outlet 20 or due to the positive pressures within the filter, the sudden discharge of this filtrate through a relatively clean filter medium, such as indicated at 14, would cause a loss of solids or a clouding of the filtrate.

Prevention of the above conditions is provided by forming a pre-coat on the filter medium which is accomplished by the bleeder valve generally indicated at 25, which is similarly bolted and secured for rotation to the filter shaft housing 10a. This bleeder valve includes a valve seat 26 having suitable valve ports which cooperate with the valve casing 27 which is held in adjustable position by the adjusting arm 28, it being understood that this casing is normally held fixed and is provided with a port 29 which communicates with the bleeder outlet 30. The entire assembly is preferably held together by the bolt 31 and the resilient spring 32.

The bleeder valve 25 is provided with a plurality of ports 33 and 34 which are in axial alignment but interconnected only through the bleeder connections including the needle valve 35 and coupling members 36 which may be provided with gauges 36a for the purpose of registering the pressure conditions within the filtrate conduits 12 with which the ports 33 communicate. It will be noted that the arrangement is such that the filtrate conduits 12 are interconnected through the ports 33, couplings 36, needle valve 35 and ports 34 with the valve casing port 29 at intervals in the rotation of the filtrate shaft.

Figure 4:
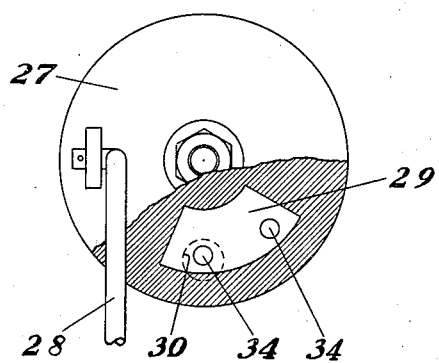
Figure 4 is an end view of the bleeder valve with parts broken away to show the port arrangement.

The operation of the apparatus is substantially as follows:

As the filter shaft rotates and one of the ports 34 is uncovered, as shown in Figure 4, the gas within the filter unit 11 tends to escape out through the bleeder port 30. The gauge 36a registers the pressure so that the needle valve 35 can be accurately adjusted for the desired operating conditions, and the escape of the pressure medium will thus reduce the pressure on the inside of the filter unit so that a cake slowly builds up on the filter medium 14. The rate at which the pressure medium is allowed to escape determines the rate of increment of the pressure differential between the inside and the outside of the filter unit and, with the low pressure difference, the slurry forms a thin pre-coat on the filter medium and at the same time the filtrate that goes through the filter medium is clear.

As the cake increases in thickness, a gradual increase in pressure is accomplished by continuing to bleed the pressure medium through the needle valve 35, and after a determined travel of the filter unit in the slurry, the full filtering pressure is exerted on the filter medium as soon as the gas pressure has escaped from the inside of the filter unit.

The full filtering pressure becomes effective after the pre-coating step, at which time there is an appreciable thickness of cake on the filter medium and, as the filtrate is about to discharge out of the bleeder valve, the port 17a in the filtrate valve is uncovered by movement of the filter shaft so that the filtrate then completely discharges out of the outlet 20. The relative size of the openings is such that there is no actual discharge of filtrate out of the bleeder valve.

It will be understood that the new apparatus makes it possible, after gases have been discharged from each filter unit, to drain an initial portion of the filtrate from the exit through the corresponding conduit 34 and the bleeder valve of port 30. This permits the condition of the first filtrate to be observed at the filter itself, and if the first filtrate for any reason should be cloudy, it can be returned for refiltration without affecting the quality of the filtrate subsequently discharged from the filtrate valve.

The use of gauges 36a is not essential in the practice of my invention, although it permits a precise adjustment of the needle valves 35 so that each filter unit may be operated under the desired conditions. It is also not essential to have the particular arrangement of pipe couplings described, as it is possible, with less satisfaction, to provide vents such as petcocks, which may be approximately adjusted for the desired bleeding operations inasmuch as the bleeding step is repeated during the continued rotation of the filter shaft. This may be substantially as satisfactory and less expensive for original installation. Indications of the rate of cake formation as shown by the gauges, which is a function of the pressure differential, is an important additional advantage of the invention, however.

It is not only of advantage to obtain a continuous clear filtrate with a resultant maximum recovery of solids in the filter cake, but pre-coating the filter medium is also of advantage in that the filter cloth does not become blinded by filter cake and it is therefore much easier to remove the filter cake during each cycle. The complete removal of the cake must be accomplished in a relatively short time due to the continuity of the operation and, by providing for quicker removal, it is possible to obtain a greater effective area for filter cake formation in the next cycle.

While I have shown and described a preferred form of embodiment of my invention, I am aware that modifications may be made thereto and I therefore desire a broad interpretation of my invention within the scope and spirit of the description herein and of the claims appended hereinafter.

I claim:

1. A continuous filter of the class described having a filter shaft, a plurality of filtrate conduits carried thereby, and a plurality of filter units interconnected to said filtrate conduits and movable into and out of a slurry to be filtered, valve means at the opposite ends of said filter shaft, said valves having outlet conduits and ports interconnecting said filtrate conduits in cyclic arrangement, one of said valves permitting a discharge at a relatively low rate whereby a pre-coating of filter cake will be formed on the filter medium prior to the discharge through the other valve.

2. A continuous filter of the class described having a filter shaft, a plurality of filtrate conduits carried thereby, a plurality of filter units interconnected to said filtrate conduits and movable into and out of a slurry to be filtered, a discharge valve at one end of said filter shaft and a bleeder valve at the other end of said filter shaft, said valves having outlet conduits and ports interconnecting said filtrate conduits in cyclic arrangement, said bleeder valve permitting a discharge at a relatively low rate whereby a precoating of filter cake will be formed on the filter medium prior to the discharge through the said discharge valve, and secondary adjustable valves connected to each of said filtrate conduits between said conduit and said bleeder valve whereby the maximum rate of discharge of each conduit through said bleeder valve can be controlled individually.

3. A continuous filter of the class described having a filter shaft, a plurality of filtrate conduits carried thereby, a plurality of filter units interconnected to said filtrate conduits and movable into and out of a slurry to be filtered, a discharge valve at one end of said filter shaft and a bleeder valve at the other end of said filter shaft, said valves having outlet conduits and ports interconnecting said filtrate conduits in cyclic arrangement, said bleeder valve permitting a discharge at a relatively low rate whereby a precoating of filter cake will be formed on the filter medium prior to the discharge through the said discharge valve, secondary adjustable valves connected to each of said filtrate conduits between said conduit and said bleeder valve whereby the maximum rate of discharge of each conduit through said bleeder valve can be controlled individually, and means provided to indicate visually and individually the pressure in each of said filtrate conduits.

JASPER A. McCASKELL.